United States Patent
Samaddar et al.

(10) Patent No.: US 6,627,087 B1
(45) Date of Patent: Sep. 30, 2003

(54) METHOD OF REMOVING LEAD FROM WATER USING A HIGH MOLECULAR WEIGHT CATIONIC DISPERSION POLYMER

(75) Inventors: Ashis K. Samaddar, Kolkata (IN); Sanjay R. Srivatsa, Lafayette, CA (US); Manoj K. Bhaduri, Hooghly (IN)

(73) Assignee: Ondeo Nalco Company, Naperville, IL (US)

( * ) Notice: Subject to any disclaimer, the term of this patent is extended or adjusted under 35 U.S.C. 154(b) by 50 days.

(21) Appl. No.: 09/939,419

(22) Filed: Aug. 24, 2001

(51) Int. Cl.[7] ............................................. C02F 1/56
(52) U.S. Cl. ................ 210/725; 210/727; 210/734; 210/735; 210/912
(58) Field of Search ............................ 210/705, 725, 210/727, 728, 734, 735, 912

(56) References Cited

U.S. PATENT DOCUMENTS

| | | | | |
|---|---|---|---|---|
| 4,758,353 A | * | 7/1988 | Spence et al. | 210/725 |
| 4,929,655 A | | 5/1990 | Takeda et al. | 524/458 |
| 5,006,590 A | | 4/1991 | Takeda et al. | 524/458 |
| 5,256,304 A | * | 10/1993 | Meyer et al. | 210/708 |
| 5,330,658 A | * | 7/1994 | Grant et al. | 210/717 |
| 5,346,627 A | | 9/1994 | Siefert et al. | 210/729 |
| 5,370,800 A | | 12/1994 | Stevenson | 210/710 |
| 5,871,648 A | * | 2/1999 | Allen et al. | 210/638 |
| 6,171,505 B1 | | 1/2001 | Maury et al. | 210/727 |
| 6,258,277 B1 | * | 7/2001 | Salmen et al. | 210/638 |

* cited by examiner

Primary Examiner—Peter A. Hruskoci

(74) Attorney, Agent, or Firm—Michael B. Martin; Thomas M. Breininger

(57) ABSTRACT

A method of removing lead from water comprising
a) adjusting the pH of the water to about 7 to about 9; and
b) adding to the water an effective amount of a water soluble, high molecular weight cationic dispersion polymer composed of
  i) (meth)acrylamide;
  ii) a hydrophilic cationic monomer of formula

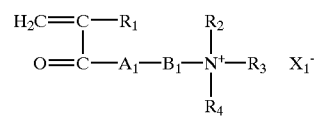

wherein $A_1$ is O or NH; $B_1$ is $C_2$–$C_4$ alkylene or hydroxypropylene; $R_1$ is H or $CH_3$, $R_2$ and $R_4$ are independently $C_1$–$C_2$ alkyl; $R_3$ is H or $C_1$–$C_2$ alkyl; and $X_1$ is an anionic counterion; and
  iii) a hydrophobic cationic monomer of formula

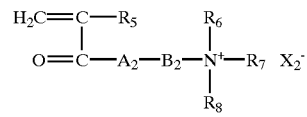

wherein $A_2$ is O or NH; $B_2$ is $C_2$–$C_4$ alkylene or hydroxypropylene; $R_5$ is H or $CH_3$; $R_6$ and $R_8$ are $C_1$–$C_2$ alkyl; $R_7$ is $C_6$–$C_{20}$ alkyl or arylalkyl; and $X_2$ is an anionic counterion;

c) optionally adding a water soluble ethylene dichloride ammonia polymer to form a mixture of water and lead-containing flocculated solids; and d) separating the lead-containing flocculated solids from the water.

9 Claims, No Drawings

METHOD OF REMOVING LEAD FROM WATER USING A HIGH MOLECULAR WEIGHT CATIONIC DISPERSION POLYMER

TECHNICAL FIELD

This invention concerns a method of removing lead from lead-containing water. More particularly, this invention is directed to a method of removing lead from near-neutral pH water using high molecular weight cationic dispersion polymers composed of (meth)acrylamide, a hydrophilic cationic monomer and a hydrophobic cationic monomer.

BACKGROUND OF THE INVENTION

Many industries, such as battery manufacture and electroplating, utilize lead in their manufacturing processes. Such use typically results in liquid (generally aqueous) effluent streams that contain residues of the lead utilized in the given manufacturing process.

Environmental compliance in removal of lead before discharge is now required in almost every country around the world. Typical permitted lead levels in the discharged water are <0.1 ppm. The traditional and commonly used techniques involving hydroxide, sulfide or carbonate precipitation are generally not effective in removing lead to this level.

Furthermore, traditional methods of removing lead from wastewater generate large sludge volumes. This sludge is generally landfilled or incinerated. The lead contained in the sludge, or ash generated as a result of incineration, can contaminate the landfill site, or vaporize and scatter into the air and cause environmental pollution. Accordingly, there is an ongoing need to develop new and effective methods of removing lead from water while simultaneously reducing the volume of sludge generated in the process.

U.S. Pat. Nos. 4,929,655, 5,006,590 and 6,171,505 B1 disclose dimethylaminoethylacrylate benzyl chloride quaternary salt/dimethylaminoethylacrylate methyl chloride quaternary salt/acrylamide dispersion polymer flocculants for waste water treatment.

U.S. Pat. No. 5,370,800 discloses a method of removing metals from wastewater comprising adding an unspecified anionic or cationic polymer flocculant to aerated, neutralized wastewater and separating the flocculated solids.

SUMMARY OF THE INVENTION

We have discovered that treatment of lead-containing water at near neutral pH with certain cationic dispersion polymers, alone or in combination with a water soluble ethylene dichloride ammonia polymer results in selective removal of lead to the sub ppb level, even in the presence of additional metals such as zinc and nickel. Use of these cationic dispersion polymers also results in accelerated solid-liquid separation and a reduction in the volume of sludge generated. Finally, because the process is effective at near neutral pH, there is lower chemical consumption for pH adjustment.

Accordingly, this invention is directed to a method of removing lead from water comprising a) adjusting the pH of the water to about 7 to about 9; and b) adding to the water an effective amount of a water soluble, high molecular weight cationic dispersion polymer composed of i) (meth)acrylamide;

ii) a hydrophilic cationic monomer of formula

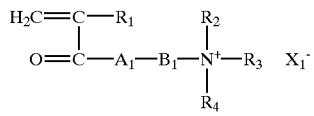

wherein $A_1$ is O or NH; $B_1$ is $C_2$–$C_4$ alkylene or hydroxypropylene; $R_1$ is H or $CH_3$, $R_2$ and $R_4$ are independently $C_1$–$C_2$ alkyl; $R_3$ is H or $C_1$–$C_2$ alkyl; and $X_1$ is an anionic counterion; and iii) a hydrophobic cationic monomer of formula

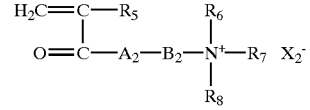

wherein $A_2$ is O or NH; $B_2$ is $C_2$–$C_4$ alkylene or hydroxypropylene; $R_5$ is H or $CH_3$; $R_6$ and $R_8$ are $C_1$–$C_2$ alkyl; $R_7$ is $C_6$–$C_{20}$ alkyl or arylalkyl; and $X_2$ is an anionic counterion;

c) optionally adding a water soluble ethylene dichloride ammonia polymer to form a mixture of water and lead-containing flocculated solids; and d) separating the lead-containing flocculated solids from the water.

DETAILED DESCRIPTION OF THE INVENTION

Definitions of Terms

"Dispersion polymer" means a fine dispersion of a water-soluble polymer in an aqueous continuous phase containing one or more inorganic salts and one or more particle stabilizing polymers. Representative examples of dispersion polymerization of water-soluble polymers in an aqueous continuous phase are found in U.S. Pat. Nos. 4,929,655, 5,006,590 and 6,171,505 B1.

Particle stabilizing polymers, also referred to as stabilizers or dispersants, facilitate the formation of fine particles and keep the formed polymer particles from becoming agglomerated and forming a gel rather than a fine dispersion of particles. Suitable particle stabilizing polymers include water-soluble cationic polymers that are soluble in the initial reaction mixture. Representative particle stabilizing polymers include homopolymers of cationic diallyl-N,N-disubstituted ammonium monomers or N,N-disubstituted-aminoethyl(meth)acrylate monomers and their quaternary salts, copolymers of diallyl-N,N-disubstituted ammonium monomers and N,N-disubstituted-aminoethyl(meth)acrylate monomers and their quaternary salts and cationic polymers comprising 20 mole percent or more of cationic diallyl-N,N-disubstituted ammonium monomers or N,N-disubstituted-aminoethyl(meth)acrylate monomers and their quaternary salts and one or more nonionic monomers, preferably acrylamide, methacrylamide or styrene. The molecular weight of the stabilizer is preferably in the range of about 10,000 to 10,000,000. Preferred particle stabilizing polymers include homopolymers of diallyldimethyl ammonium chloride, dimethylaminoethylacrylate methyl chloride quaternary salt and dimethylaminoethylmethacrylate methyl chloride quaternary salt. The particle stabilizing polymer(s) are used in an amount of from about 1 to about 10% by weight based on the total weight of the dispersion polymer.

Polyvalent anionic salts suitable for preparing the dispersion polymer include inorganic or organic sulfates, phosphates, chlorides or a mixture thereof. Preferred salts anionic salts include ammonium sulfate, sodium sulfate, magnesium sulfate, aluminum sulfate, ammonium hydrogen phosphate, sodium hydrogen phosphate, potassium hydrogen phosphate and ammonium chloride. The salts are used in aqueous solution typically having a combined total concentration of 15 weight percent or above in the product mixture.

The cationic dispersion polymer of this invention is prepared by preparing a mixture of water, one or more polyvalent anionic salts, nonionic monomers, hydrophilic cationic monomers, hydrophobic cationic monomers, one or more particle stabilizing polymers, any polymerization additives such as chelants, pH buffers or chain transfer agents and charging the mixture to a reactor equipped with a mixer, a temperature regulating thermocouple, a nitrogen purging tube, and a water condenser.

A batch or semi-batch polymerization method can be employed to prepare the dispersion polymer of this invention. In a batch polymerization, the polymeric stabilizers, chain transfer agents, monomers, chelant, and water are initially added to the reactor. All or a portion of the formulation salt/salts are also added to the reactor at this time. Mechanical agitation is started and the reactor contents are heated to the desired polymerization temperature. When the set-point temperature is reached, the initiator is added and a nitrogen purge is started. The reaction is allowed to proceed at the desired temperature until completion and then the contents of the reactor are cooled. Additional inorganic salts may be added during the polymerization to maintain processability or influence final product quality. Moreover, additional initiator may be added during the reaction to achieve desired conversion rates and facilitate reaction completeness. Post polymerization additives such as additional salt, water, stabilizers for molecular weight and pH and anti-foaming and biocidal agents may also be added to the reaction mixture.

Use of a semi-batch polymerization method will vary from a batch polymerization method only in that one or more of the monomers used in the synthesis of the polymer are held out in part or whole at the beginning of the reaction. The withheld monomer is then added over the course of the polymerization. If acrylamide monomer is used as a semi-batch monomer, a chelant is often also added during the semi-batch period.

A multifunctional alcohol such as glycerin or polyethylene glycol may also be included in the polymerization system. The deposition of the fine particles is smoothly carried out in the presence of these alcohols. A chain transfer agent such as sodium formate may also be added to control precipitation and polymer molecular weight.

The polymerization reaction is initiated by any means that results in generation of a suitable free-radical. Thermally derived radicals, in which the radical species results from thermal, homolytic dissociation of a water-soluble azo, peroxide, hydroperoxide and perester compound are preferred. Especially preferred initiators are azo compounds including 2,2'-azobis[2-(2-imidazolin-2-yl)propane] dihydrochloride and 2,2'-azobis(2-methylpropionamide) dihydrochloride.

A seed polymer may be added to the reaction mixture before the initiating polymerization of the monomers for the purpose of obtaining a fine dispersion. The seed polymer is a water-soluble cationic polymer that is insoluble or has reduced solubility in the aqueous solution of the polyvalent anion salt. The monomer composition of the seed polymer need not be identical to that of the water-soluble cationic polymer formed during polymerization. The seed polymer is preferably a polymer prepared from the above monomer mixture by the process described herein.

Since the dispersion polymers do not contain surfactants or oil, the dispersion polymers are environmentally friendly. Moreover, the absence of oil in the dispersion polymers equates to such polymers having virtually zero volatile organic content (VOC), which is another environmental advantage of such polymers.

The cationic dispersion polymers described herein confer additional advantages to the lead-removal process. Specifically, the cationic dispersion polymers are used without the unwanted addition of oils and surfactants as compared to conventional cationic latex polymers, imparting both processing and environmental benefits. Additionally, these cationic dispersion polymers require no inverter system and can be introduced to the waste water using simple feeding equipment resulting in savings in manpower and water resources.

The cationic dispersion polymers of this invention also offer advantages over dry powder polymer products. In most cases, conventional water-soluble polymers are now commercially available in a powder form. Dry powered products present environmental hazards due to dusting and inhalation problems associated with the particulate nature of the products. Additionally, prior to use, the polymeric powder must be dissolved in an aqueous medium for actual application. The polymer swells in aqueous medium, and the dispersed particles flocculate. It is typically very difficult to dissolve the conventional polymers in an aqueous medium. By contrast, the cationic dispersion polymers of this invention, by their nature, avoid dissolution-related problems.

The cationic dispersion polymers of this invention also offer advantages over solution polymer products. In general, solution polymerization is used to prepare lower molecular weight polymers, as the solution tends to become too viscous as the polymer molecular weight increases. Polymer actives concentrations are also significantly restricted by the resulting high product viscosity in solution polymer products. Use of dispersion polymerization techniques as described herein allow for the preparation of free-flowing high molecular weight, high polymer actives polymer compositions whereas the corresponding solution polymer would otherwise be too viscous for use without prior dilution.

"Ethylene dichloride ammonia polymer" means polymers prepared by the reaction of ethylene dichloride and ammonia that are subsequently modified by reaction with carbon disulfide to incorporate dithiocarbamate groups into the polymer. Preferred ethylene dichloride ammonia polymers are derived from ethylene dichloride ammonia polymers having a molecular weight of about 500 to about 100,000 and contain from about 5 to about 50 mole percent of dithiocarbamate salt groups. The preparation and use of ethylene dichloride ammonia polymers and their use for removing metals from water is described in U.S. Pat. No. 5,346,627, incorporated herein by reference. The polymers are available from ONDEO Nalco Company, Naperville, Ill. under the tradename Nalmete®.

"Hydrophilic cationic monomer" means a monomer as defined herein which possesses a net positive charge and is relatively hydrophilic in nature. Hydrophilic cationic monomers have formula

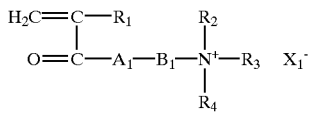

wherein $A_1$ is O or NH; $B_1$ is $C_2$–$C_4$ alkylene or hydroxypropylene; $R_1$ is H or $CH_3$, $R_2$ and $R_4$ are independently $C_1$–$C_2$ alkyl; $R_3$ is H or $C_1$–$C_2$ alkyl; and $X_1$ is an anionic counterion. Representative hydrophilic cationic monomers include dimethylaminoethylacrylate methyl chloride salt (DMAEA.MCQ), dimethylaminoethylmethacrylate methyl chloride salt (DMAEM.MCQ), dimethylaminoethylmethacrylate methyl sulfate salt (DMAEM.MSQ), dimethylaminoethylacrylate methyl sulfate salt (DMAEA.MSQ), methacrylamidopropyl trimethylammonium chloride (MAPTAC), acrylamidopropyl trimethylammonium chloride (APTAC), and the like. Dimethylaminoethylacrylate methyl chloride salt is preferred.

"Hydrophobic cationic monomer" means a monomer as defined herein which possesses a net positive charge and is relatively hydrophobic in nature. Hydrophobic cationic monomers have formula

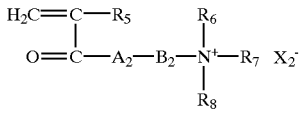

wherein $A_2$ is O or NH; $B_2$ is $C_2$–$C_4$ alkylene or hydroxypropylene; $R_5$ is H or $CH_3$; $R_6$ and $R_8$ are $C_1$–$C_2$ alkyl; $R_7$ is $C_6$–$C_{20}$ alkyl or arylalkyl; and $X_2$ is an anionic counterion. Representative hydrophobic cationic monomers include dimethylaminoethylmethacrylate benzyl chloride salt (DMAEM.BCQ), dimethylaminoethylacrylate benzyl chloride salt (DMAEA.BCQ), dimethylaminoethylacrylate cetyl chloride salt, and the like. Dimethylaminoethylacrylate benzyl chloride salt is preferred.

"High molecular weight cationic dispersion polymer" means a dispersion polymer as defined herein having a reduced specific viscosity of from about 10 to about 35 dL/g in 0.125N ammonium nitrate solution.

"(Meth)acrylamide" means acrylamide or methacrylamide.

"Reduced Specific Viscosity" (RSV) is an indication of polymer chain length and average molecular weight. The RSV is measured at a given polymer concentration and temperature and calculated as follows:

$$RSV = \frac{\left[\left(\frac{\eta}{\eta_o}\right) - 1\right]}{c}$$

wherein $\eta$=viscosity of polymer solution;

$\eta_o$=viscosity of solvent at the same temperature; and c=concentration of polymer in solution.

As used herein, the units of concentration "c" are (grams/100 ml or g/deciliter). Therefore, the units of RSV are dl/g. The RSV is measured at 30° C. The viscosities $\eta$ and $\eta_o$ are measured using a Cannon-Ubbelohde semimicro dilution viscometer, size 75. The viscometer is mounted in a perfectly vertical position in a constant temperature bath adjusted to 30±0.02° C. The error inherent in the calculation of RSV is about 2 dl/g. For the RSV measurements reported herein, the polymer concentration used is 0.045% polymer actives dissolved in a 0.125N ammonium nitrate solution.

Similar RSVs measured for two linear polymers of identical or very similar composition is one indication that the polymers have similar molecular weights, provided that the polymer samples are treated identically and that the RSVs are measured under identical conditions.

"Intrinsic viscosity" (IV) means RSV in the limit of infinite polymer dilution (i.e. the intercept where polymer concentration is extrapolated to zero). The IV, as used herein, is obtained from the y-intercept of the plot of RSV versus polymer concentration in the range of from about 0.015 to about 0.045 weight percent polymer.

Preferred Embodiments

In a preferred aspect of this invention, the high molecular weight cationic dispersion polymer has a cationic charge of from about 35 mole percent to about 80 mole percent.

In another preferred aspect, the hydrophilic cationic monomer is dimethylaminoethylmethacrylate methyl chloride quaternary salt.

In another preferred aspect, the hydrophobic cationic monomer is dimethylaminoethylmethacrylate benzyl chloride quaternary salt.

In another preferred aspect, the pH of the wastewater is adjusted to about 7.5 to about 8.6.

In another preferred aspect, the cationic dispersion polymer is composed of from about 20 to about 65 mole percent acrylamide, from about 10 to about 30 mole percent dimethylaminoethylmethacrylate methyl chloride quaternary salt and from about 25 to about 50 mole percent dimethylaminoethylmethacrylate benzyl chloride quaternary salt.

In another preferred aspect, the cationic dispersion polymer has a cationic charge of about 80 mole percent.

In another preferred aspect, the pH of the wastewater is adjusted to about 7.5 to about 8.3.

In another preferred aspect, the cationic dispersion polymer is composed of about 20 mole percent acrylamide, about 30 mole percent dimethylaminoethylmethacrylate methyl chloride quaternary salt and about 50 mole percent dimethylaminoethylmethacrylate benzyl chloride quaternary salt.

Lead-containing waste water suitable for treatment according to this invention includes industrial waste water and municipal waste water.

Prior to addition of the high molecular weight cationic dispersion polymer, the pH of the waste water is adjusted to about 7 to about 9 with a neutralizing agent. Preferred neutralizing agents include lime, soda ash, caustic soda, and the like. In the case of highly alkaline waste water, sulfuric acid is used.

The high molecular weight cationic dispersion polymer and optionally, the water soluble ethylene dichloride ammonia polymer are then added in an amount sufficient to effectively remove lead from the waste water.

The optimal amounts of the high molecular weight cationic dispersion polymer and the water soluble ethylene dichloride ammonia polymer are empirically determined based on the type of waste water being treated and the amount of lead contained therein. Important additional considerations include the temperature, pH and the amount and nature of the suspended solids in the waste water. A dispersion polymer dose of about 5 to about 25 ppm (based on polymer actives) is preferred. A dose of about 10 to about 15 ppm is more preferred.

The method of this invention is effective for removing lead from untreated waste water or filtrate produced by dewatering. The high molecular weight cationic dispersion polymer is directly injected into the waste water. The polymer may be added neat, but is preferably activated by dilution with water and mixing to dissolve and disentangle the polymer particles. Use of a one percent aqueous polymer solution, based on polymer actives, is preferred.

The ethylene dichloride ammonia polymer is added as an aqueous solution as described in U.S. Pat. No. 5,346,627. A ethylene dichloride ammonia polymer polymer dose of about 5 to about 20 ppm (based on polymer actives) is preferred. A dose of about 10 to about 15 ppm is more preferred. Typically, adding 10–15 ppm of dispersion polymer to wastewater is sufficient to reduce lead content to sub ppm levels. Further addition of 10–15 ppm of ethylene dichloride ammonia polymer to the waste water reduces lead to sub ppb levels.

Once the polymers are added to the waste water, the treated water is naturally agitated as it moves through the process stream of the industrial or municipal plant. The polymers of the invention cause the lead and suspended solids to flocculate and settle. The lead-containing flocculated solids are then removed from the water by conventional means including filtration, dissolved air flotation, mechanical dewatering using a belt press, and the like. The treated water can now be discharged either into a river, lake or recycled into an industrial process.

The foregoing may be better understood by reference to the following examples, which are presented for purposes of illustration and are not intended to limit the scope of the invention.

EXAMPLE 1

The lead content of water samples is measured by HACH Method no. 8317 for drinking water (Lead Trak™ Fast Column Extraction Method, U.S. Pat. No. 5,019,516) using a Nalco DR 2010 Spectrophotometer (ONDEO Nalco Company, Naperville, Ill.) as follows.

1. Stored Program Number 283 for the Lead Column extraction method is entered.
2. The wavelength of the Spectrophotometer is adjusted to 477 nm.
3. The sample to be tested (100 ml) is placed in a 250 ml plastic beaker.
4. Using a plastic dropper, 1.0 ml of pPb-1 Acid Preservative Solution (available from HACH Company, Loveland, Colo.) is added to the sample, the sample is swirled to mix and then allowed to stand for exactly 2 minutes.
5. Two ml of pPb-2 Fixer Solution is added to the sample with swirling to mix.
6. The sample is poured into a new Fast Column Extractor (available from HACH Company, Loveland, Colo.) and the drained portion is collected in a plastic beaker.
7. After the flow has stopped, the adsorbent pad of the column is compressed fully with the help of a plunger provided with the column. The contents of the beaker are discarded.
8. A 25 ml sample cell is placed under the extractor and using a 25 ml plastic graduated cylinder, 25 ml of pPb-3 Eluant Solution is poured into the column.
9. After the Eluant Solution has started to drip from the extractor, the plunger is inserted again and the remaining Eluant Solution is slowly forced through the extractor. The adsorbent is fully compressed. The volume in the sample cell should be 25 ml.
10. Using a one ml plastic dropper, 1.0 ml of pPb-4 Neutralizer Solution is added to the cell and the solution is mixed thoroughly.
11. One powder pillow of pPb-5 Indicator is then added and the solution is swirled thoroughly to mix.
12. The sample is split into two parts, placed in two 10 ml vials and allowed to stand for two minutes.
13. Three drops of pPb-6 Decolorizer Solution are then added to one of the vials and the contents are mixed.
14. The decolorized sample is placed in the sample compartment of the Spectrophotometer, press zero.
15. The other vial is placed in the sample compartment to read the lead content in ppb.

The above method is suitable for measuring lead content of from 0 to about 150 ppb. If the concentration is high in the sample, then the sample may have to be diluted, to bring it within the range of estimation.

EXAMPLE 2

Lead-containing effluent is collected in a beaker and its pH is adjusted to 7.5–8.3 with lime, soda ash or caustic soda, or in the case of highly alkaline effluent, sulphuric acid.

A stock solution of cationic dispersion polymer (0.1% w/v) is prepared fresh in a beaker with stirring.

A one-liter sample of effluent, pH-adjusted as above, is placed in a second beaker and stirred using a magnetic stirrer. The cationic dispersion polymer stock solution (10–15 ppm) and optionally ethylene dichloride ammonia polymer (10–20) ppm is added to the effluent via syringe and the stirring speed is then reduced. Flocculation begins immediately. However, a residence time of 20–25 minutes is optimal. The supernatant is then filtered through Whatman 41 filter paper and tested for lead content as described in Example 1.

For example, treatment of effluent having a lead content of 1.5 to 4.0 ppm with 10–15 ppm of a 20% actives 50:30:20 mole percent dimethylaminoethylacrylate benzyl chloride quaternary salt/dimethylaminoethylacrylate methyl chloride quaternary salt/acrylamide dispersion polymer (available from ONDEO Nalco Company, Naperville, Ill.) reduces the lead content to the ppb level.

Treatment of effluent having a lead content of 23 ppm with the same polymer reduces the lead content to <0.1 ppm. Treatment of the effluent with dispersion polymer and ethylene dichloride ammonia polymer (available from ONDEO Nalco Company, Naperville, Ill.) as described above reduces the lead content from sub-ppm to sub ppb levels. In addition, treatment with ethylene dichloride ammonia polymer effectively removes additional metals such as nickel from the effluent.

EXAMPLE 3

Highly acidic effluent (pH=approximately 2.0) containing 7–20 ppm lead from an electroplating plant is adjusted to pH 7.5–8.3 with lime at the neutralization chamber. The effluent is then pumped into a reaction chamber where 20% actives 50:30:20 mole percent dimethylaminoethylacrylate benzyl chloride quaternary salt/dimethylaminoethylacrylate methyl chloride quaternary salt/acrylamide dispersion polymer is dosed @ 10–15 ppm from a 1.0% stock solution. The effluent is then passed through a Lamella clarifier, where all the flocs formed are settled and the supernatant is allowed to pass through a dual media filter and then an activated carbon filter before discharge. Lead content is checked at the overflow of the Lamella clarifier and also at the final discharge by the HACH method described in Example 1, above. At both the points, the lead content is less than 100 ppb.

Although this invention has been described in detail for the purpose of illustration, it is to be understood that such detail is solely for that purpose and that numerous modifications, alterations and changes can be made therein by those skilled in the art without departing from the spirit and scope of the invention except as it may be limited by the claims. All changes which come within the meaning and range of equivalency of the claims are to be embraced within their scope.

We claim:

1. A method of removing lead from water comprising
   a) adjusting the pH of the water to about 7 to about 9; and
   b) adding to the water an effective amount of a water soluble, cationic dispersion polymer having a cationic charge of about 35 to about 80 mole percent and a reduced specific viscosity of about 10 to about 35 dl/g in 0.125N ammonium nitrate solution, the polymer composed of
      i) (meth)acrylide;
      ii) a hydrophilic cationic monomer of formula

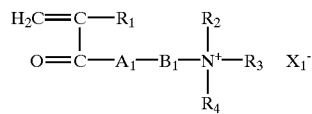

wherein $A_1$ is O or NH; $B_1$ is $C_2$–$C_4$ alkylene or hydroxypropylene; $R_1$ is H or $CH_3$, $R_2$ and $R_4$ are independently $C_1$–$C_2$ alky; $R_3$ is H or $C_1$–$C_2$ alkyl; and $X_1$ is an anionic counterion; and
      iii) a hydrophobic cationic monomer of formula

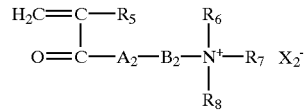

wherein $A_2$ is O or NH; $B_2$ is $C_2$–$C_4$ alkylene or hydroxypropylene; $R_5$ is H or $CH_3$; $R_6$ and $R_8$ are $C_1$–$C_2$ alkyl; $R_7$ is $C_6$–$C_{20}$ alkyl or arylalkyl; and $X_2$ is an anionic counterion;

c) optionally adding a water soluble ethylene dichloride ammonia polymer to form a mixture of water and lead-containing flocculated solids; and
   d) separating the lead-containing flocculated solids from the water.

2. The method of claim 1 wherein the hydrophilic cationic monomer is dimethylaminoethylmethacrylate ate methyl chloride quaternary salt.

3. The method of claim 2 wherein the hydrophobic cationic monomer is dimethylaminoethylmethacrylate benzyl chloride quaternary salt.

4. The method of claim 3 wherein the pH of the water is adjusted to about 7.5 to about 8.6.

5. The method of claim 3 wherein the cationic dispersion polymer is composed of from about 20 to about 65 mole percent acrylamide, from about 10 to about 30 mole percent dimethylaminoethylmethacrylate methyl chloride quaternary salt and from about 25 to about 50 mole percent dimethylaminoethylmethacrylate benzyl chloride quaternary salt.

6. The method of claim 5 wherein the cationic dispersion polymer has a cationic charge of about 80 mole percent.

7. The method of claim 6 wherein the pH of the water is adjusted to about 7.5 to about 8.3.

8. The method of claim 7 wherein the cationic dispersion polymer is composed of about 20 mole percent acrylamide, about 30 mole percent dimethylaminoethylmethacrylate methyl chloride quaternary salt and about 50 mole percent dimethylaminoethylmethacrylate benzyl chloride quaternary salt.

9. The method of claim 1 wherein the water soluble ethylene dichloride ammonia polymer has a molecular weight of from about 500 to about 100,000 and contains from about 5 to about 50 mole percent of dithiocarbamate salt groups.

* * * * *